United States Patent
Boudreau et al.

(10) Patent No.: US 6,841,486 B2
(45) Date of Patent: Jan. 11, 2005

(54) OPTICAL SUBSTRATE HAVING ALIGNMENT FIDUCIALS

(75) Inventors: Robert Addison Boudreau, Corning, NY (US); Christian Drabenstadt, Columbia, MD (US); Jeffery Emerson Schramm, Lompoc, CA (US)

(73) Assignee: Tyco Electronics Corporation, Middletown, PA (US)

( * ) Notice: Subject to any disclaimer, the term of this patent is extended or adjusted under 35 U.S.C. 154(b) by 82 days.

(21) Appl. No.: 09/974,641

(22) Filed: Oct. 9, 2001

(65) Prior Publication Data

US 2002/0151181 A1 Oct. 17, 2002

Related U.S. Application Data

(60) Provisional application No. 60/238,815, filed on Oct. 6, 2000.

(51) Int. Cl.[7] .............................................. H01L 21/302
(52) U.S. Cl. ........................................ 438/719; 385/51
(58) Field of Search ...................... 385/51–55; 438/706, 438/710, 712, 719

(56) References Cited

U.S. PATENT DOCUMENTS

| | | | | | |
|---|---|---|---|---|---|
| 5,550,088 | A | * | 8/1996 | Dautartas et al. | 216/2 |
| 5,981,975 | A | * | 11/1999 | Imhoff | 257/81 |
| 6,163,639 | A | * | 12/2000 | Ollier et al. | 385/52 |
| 6,344,148 | B1 | * | 2/2002 | Park et al. | 216/2 |
| 6,483,969 | B1 | * | 11/2002 | Yap et al. | 385/52 |
| 6,516,448 | B1 | * | 2/2003 | Vieider et al. | 716/2 |

* cited by examiner

*Primary Examiner*—Kin-Chan Chen

(57) ABSTRACT

A process comprising: (a) applying a stop etch mask to a substrate, the mask defining the location on the substrate of a groove for receiving a waveguide and one or more fiducials for positioning the optical device on the substrate relative to the waveguide; and (b) etching the substrate to define the fiducials and the groove, the groove being dimensioned to receive at least a portion of a waveguide and the fiducials enabling the optical device to be positioned on the substrate such that it is optically aligned with the waveguide.

22 Claims, 2 Drawing Sheets

OPTICAL SUBSTRATE HAVING ALIGNMENT FIDUCIALS

RELATED APPLICATION

The application is based upon Provisional Application No. 60/238,815, filed Oct. 6, 2000, and hereby incorporated by reference.

FIELD OF INVENTION

This invention relates generally to optical substrates, and, more particularly, to optical substrates having alignment features for aligning optical components thereon.

BACKGROUND OF INVENTION

It is well known to align optical components on a silicon substrate using register surfaces as mechanical stops. In this approach, an optical device, such as a laser, is precisely aligned to a silicon wafer surface by butting a precision notch surface of the laser against a mechanical stop or pedestal protruding from the silicon wafer board surface. The height of the laser or optical device is determined by the height of a separate etched standoff positioned under the laser on the wafer surface. An optical fiber, intended to be optically aligned to that laser, is registered to the silicon wafer board by bonding it to a precision-etched V-groove. Because the optical components are aligned to the silicon wafer board, they are aligned to each other. This alignment process is referred to herein as "physical passive alignment" or "physical alignment."

Although physical alignment offers relatively high accuracy in aligning optical components on a substrate, the applicants have identified two major disadvantages of the approach which limit its accuracy. First, the formation of the V-groove is made traditionally by a crystallographic wet etch which is very sensitive to the orientation of the wafer crystal and is constrained in shape. Indeed, the sole purpose of the crystallographic etch is to expose slow etching 111 silicon wafer crystal surfaces that then can be used for holding parts mechanically. Unfortunately, commercially-available silicon wafers are provided with orientation markings which have a significant tolerance, e.g., +/−0.5°. If an etching mask, for the purpose of etching a V-groove trench, is placed on the surface with the trench out of crystal alignment by even 0.50°, the trench will etch deeper than expected and the centerline of the trench will shift out of position making the substrate for holding the optical components slightly imprecise.

The second major disadvantage of the present process is that the mask for defining the V-groove trench is not on the same mask level as the mask used for defining the fiducials for positioning the laser. This means that there is additional error introduced if the two separate masks are not precisely aligned to each other's position in subsequent fabrication steps in the wafer board's fabrication.

Therefore, the applicants have identified a need for an optical substrate having precision alignment features which are unaffected by crystalline misalignment and avoid tolerance build up of multiple mask application steps. The present invention fulfills this need among others.

SUMMARY OF INVENTION

The present invention provides for an optical substrate having highly precise alignment features for receiving and aligning optical components thereon. The accuracy and precision realized by the substrate of the present invention is due to a single masking step which defines all the critical alignment features on the substrate. Traditionally, this was not possible because the various alignment features were formed with totally different processes requiring different conditions and separate masking steps. Specifically, the V-groove is deep and thus required a wet etching process, while the fiducials have planar surfaces perpendicular to the substrate surface and thus required a dry etching process such as reactive ion etching (RIE). The applicants, however, have recognized that inductively coupled plasma (ICP) etching may be used both for deep etching and for vertical planar surfaces. This one etching process allows for a single masking step which eliminates mask mismatches and tolerance buildup.

Additionally, the problem of crystallographic wafer orientation is obviated because the ICP process is an isotropic etching process meaning that it has essentially no dependency on the wafer crystal orientation. In fact, it should even work for polycrystalline wafers which are cast rather than grown epitaxially, and thus are much less expensive than crystalline silicon.

Therefore, the present invention exploits ICP etching to prepare more optimized, higher precision substrates for passive alignment of optical components.

One aspect of the invention is a process of preparing a substrate using a single making step to define the critical alignment features. In a preferred embodiment, the process comprises: (a) applying a stop etch mask to a substrate, the mask defining the location on the substrate of a groove for receiving the waveguide and one or more fiducials for positioning the optical device on the substrate relative to the waveguide; and (b) etching the substrate to define the fiducials and the groove, the groove being dimensioned to receive at least a portion of a waveguide and the fiducials enabling the optical device to be positioned on the substrate such that it is optically aligned with the waveguide.

Another aspect of the invention is a substrate made in accordance with the process of the invention.

Yet anther aspect of the invention is an optical component substrate having highly precise alignment features. In a preferred embodiment, the substrate comprises: (a) a groove for receiving a waveguide; and (b) fiducials for facilitating the alignment of an optical device on the substrate, wherein the tolerance of the alignment of the groove to the fiducials is less than ±0.2 $\mu$m. an optical subassembly.

Still another aspect of the invention is an optical subassembly comprising the substrate of the present invention. In a preferred embodiment, the optical subassembly comprises: (a) an optical component substrate comprising at least: (i) a groove for receiving a waveguide; (ii) fiducials for facilitating the alignment of an optical device on the substrate, wherein the tolerance of the alignment of the groove to the fiducials is less than ±0.2 $\mu$m. (b) a waveguide disposed in the groove; and (c) an optical device aligned with the fiducials.

A further aspect of the invention is an optical package comprising the optical subassembly of the present invention. In a preferred embodiment, the optical package is a transceiver.

DETAILED DESCRIPTION OF PREFERRED EMBODIMENT

Figure 1:
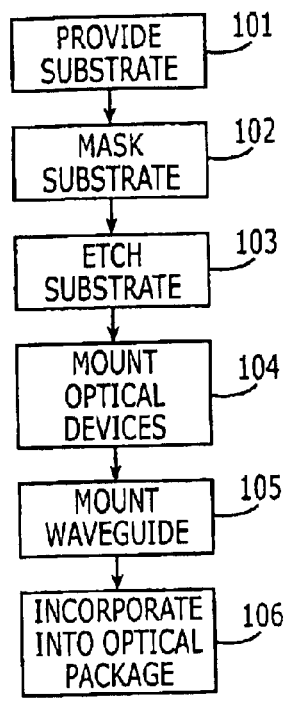
FIG. 1 is a flow chart of the process of the present invention.

Referring to FIG. 1, a flow chart of the process of the present invention is shown indicating the steps for preparing a substrate with alignment features. As used herein, the term "alignment features" refers to contours in the substrate formed by etching which are adapted to receive a waveguide and at least one optical device and align them on the substrate such that they are optically coupled. It should be understood that optical coupling may be achieved directly by coaxially aligning the optical axes of the optical device and waveguide or indirectly by using a light bending device such as a prism to couple the optical axes of the components. Typical alignment features include, for example, a groove for receiving a waveguide, such as a fiber, and fiducials for providing a reference surface for placing an optical device, such as a laser die, on the substrate in precise alignment with the waveguide.

In step 101, a suitable substrate is provided for contouring alignment features thereon. The substrate has an x, y, z, orientation and a substrate surface along an xz plane. As used herein, the terminology related the x, y, z orientation is for illustrative purposes and should not be used to limit the scope of the invention. The substrate surface has a specific point thereon about which the optical device and waveguide are positioned so that they optically couple. The specific point typically corresponds to an optical axis of the optical device, such as the light emitting spot of an edge emitting laser. In step 102, a mask is applied to the substrate. The mask defines the location on an xz plane of the substrate for the alignment features. In step 103, the substrate is etched to define the fiducials and the groove. It is important to understand, that although the etching step is depicted in one process step in this flowchart, it is likely and even preferable that the etching step be performed using a number of discrete sub-steps targeted at different features of the substrate.

Once the etching is complete, a substrate is provided which has precise alignment features for receiving optical components. Such a component may be shipped to third parties for incorporation of the optical components therein or the process may be extended to include the population of the substrate with optical components as depicted in steps 104 and 105, which may be performed in any order. In step 104, the optical device is disposed on the substrate and aligned with the specific point on the substrate using the fiducials, either by physical passive alignment or visual passive alignment. In step 105, the waveguide is disposed in the groove and is aligned to the specific point on the substrate by registering it against surfaces defined by the groove. At this point an optical subassembly is provided which may be incorporated into a larger optical package such as an amplifier, transmitter, receiver, or transceiver in step 106.

Figure 2:
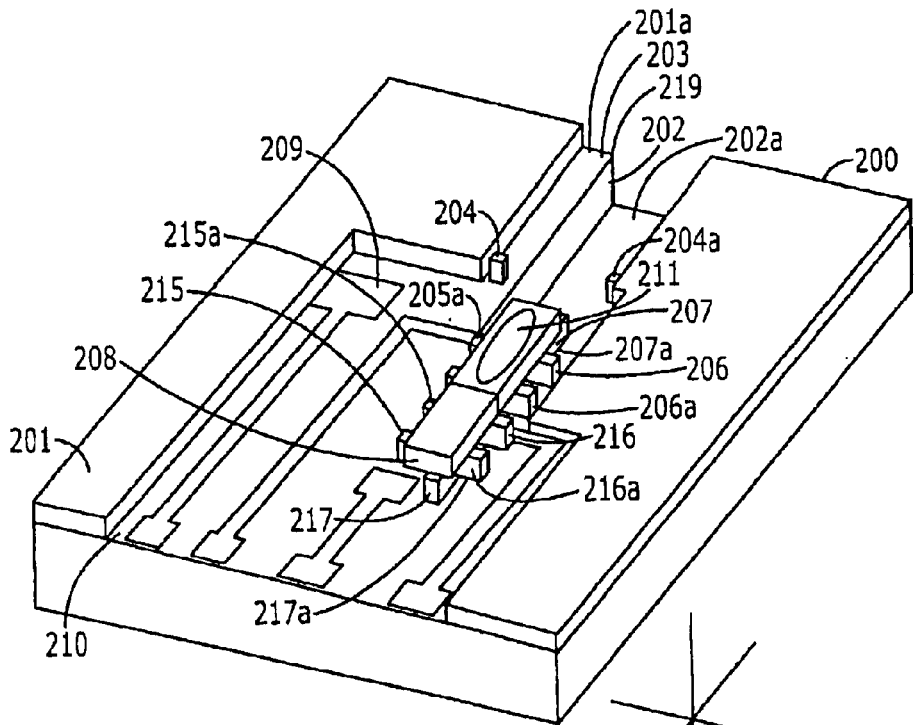
FIG. 2 is a perspective view of a substrate of the present invention having precision alignment features.
Figure 3:
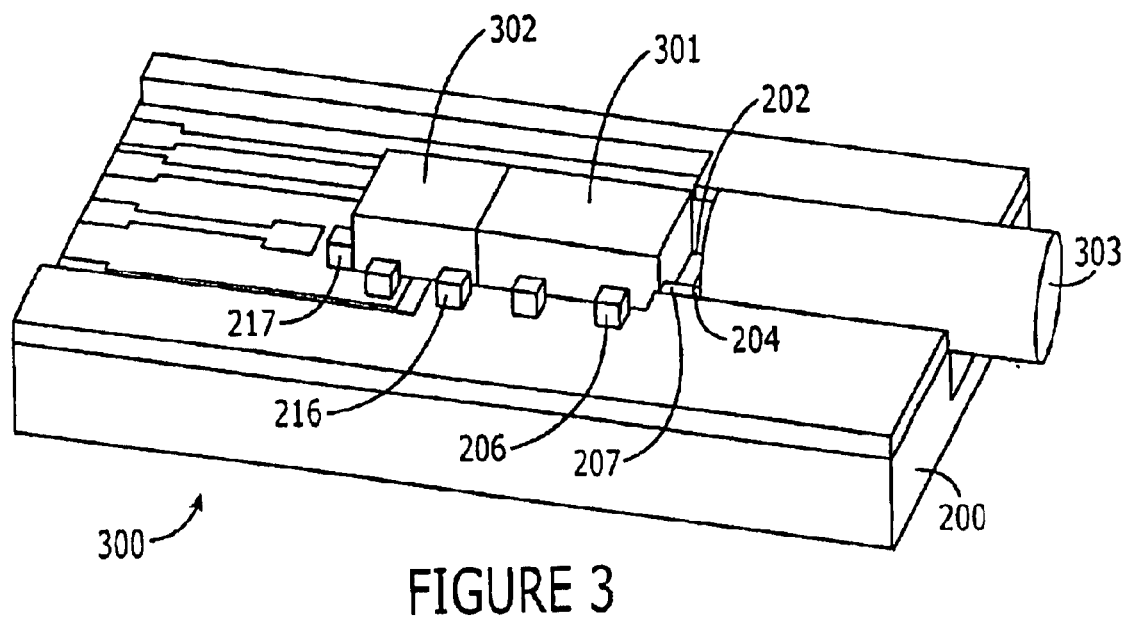
FIG. 3 is a perspective view of an optical subassembly comprising the substrate of FIG. 2.

Each of the above steps are described in greater with respect to the FIGS. 2 and 3 which depict, respectively, a plain substrate having alignment features and an optical subassembly populated with an optical device and waveguide.

With respect to process step 101, the substrate 200 may be any material suitable for etching and formed to have a planar substrate surface 201 in an xz plane. Suitable materials include, for example, silicon (either crystalline or polycrystalline wafers), silica, and ceramics such as alumina, aluminum nitride, and silicon carbide. A polycrystalline silicon wafer is preferred from the standpoint of thermal conductivity, commercial availability, and low cost. Its unpredictable and imprecise crystalline structure is of little concern since the etching used in step 103 is preferably an inductively coupled plasma (ICP) etching process which is isotropic unlike wet etching which requires a particular crystalline structure to etch in a predicatble fashion. Furthermore, since an ICP etching process does not rely on the crystalline structure of the material, there is no need to invest time and effort in determining the silicon's crystalline orientation.

It may be preferable to prepare the silicon substrate for etching by oxidizing its surface using techniques that are well known in the art to form a layer of oxide on the surface. It has been found that an oxide layer of 5500 Å provides for good results, although those of skill in the art may develop optimum thickness for particular applications.

With respect to step 102, the masking of the alignment features is performed using conventional techniques with a single mask which defines the location of the alignment features in an xz plane of the substrate. Since the single mask level can define all of the key critical alignment features, there is no error in aligning one mask level to another with sub-micron high positional precision. Thus, tolerance buildup and mask misalignment are avoided. Furthermore, it is preferable to apply the mask before the surface of the substrate is etched or contoured to any significant extent since masking is most accurate on a planar surface. Thus, a single mask which defines all of the critical optical alignment features is applied to the substrate at the point in which the margin for error is the lowest.

With respect to step 103, the alignment features are etched into the substrate. In a preferred embodiment, different types of fiducials are etched to provide the optical device with passive x, y, z alignment on the substrate. These fiducials may be used as a visual indicator to align the optical device visually or they may be used as mechanical "stops" to align the optical device physically. Preferably, the fiducials are used for physical alignment due to the greater accuracy physical alignment affords and due to its facilitation of bulk reflow processes for increased throughput.

In physical alignment, these fiducials are configured to contact register surfaces on the optical device which are precise distances from the device's optical axis along the x, y, z axes. Such physical alignment is well known in the art. Briefly, to control the optical device's position along the y-axis, preferably one or more standoffs or first fiducials 205, 215 are used. In this particular embodiment, first fiducials 205 are adapted to receive and support a laser 301, while first fiducials 215 are adapted to receive and support a detector 302 for the laser. The first fiducials have a first register surfaces 205a and 205a which are parallel to the substrate surface 201, i.e., in an xz plane.

To control the optical device's position along the x and z axes, preferably one or more second and third fiducials or pedestals are used, respectively. In this particular embodiment, second fiducials 206 and 216 and third fiducials 207 and 217 are used for the laser 301 and detector 302 respectively. The second and third fiducials have second and third register surfaces 216a and 217a which are perpendicular to the substrate surface 201. In one embodiment, the second and third register surfaces lie, respectively, in an yz plane and an xy plane. In certain embodiments, it may be preferable to use a set of the second or third fiducials, i.e., two second fiducials 206 as shown, to prevent the optical device from rotating in the xz plane.

The other alignment feature of particular interest in this application is the groove. The groove provides edges or walls which the waveguide contacts to position the waveguide precisely with respect to the specific location on the substrate. Although any conventional groove for receiving a waveguide can used, in a preferred embodiment, a U-groove 202 is formed in the substrate. A U-groove is preferred over a V-groove due to its greater precision, especially with respect to positioning a fiber 303 therein. Specifically, in a U-groove, the position of the fiber along the x and y axes is achieved by registering the perimeter of the fiber against the edges formed by the top portion of the U-groove wall and the top of the substrate. Since the walls of a U-groove are essentially parallel, the controlling parameter of the U-groove with respect to the y axis positioning, i.e., width, remains constant regardless of the depth of the groove. On the other hand, a V-groove has divergent walls and thus the depth of the V-groove has a dramatic affect on the y-axis position of the fiber therein.

Unfortunately, in a U-groove, it is not possible to contact the fiber's perimeter with the edges of the U-groove unless the U-groove is more narrow than the fiber. Thus, it is not possible to lower the center of the fiber below the top edge of the U-groove. This is a significant problem given the relatively large size of the waveguide compared to the optical devices and thus the need to lower the waveguide's optical axis to that of the optical device's. The applicants, however, have overcome this problem by etching a U-groove terrace 203 around the U-groove 202. This lowers the edges 219 formed by the U-groove and the effective top 201 a of the substrate and thereby lowers the centerline of the optical axis of the fiber with respect to the substrate surface.

In addition to etching edges in the substrate for aligning the waveguide along the x and y axes, preferably a mechanical stop 204 is etched to position the fiber along the z-axis. The stop preferably has a fourth register surface 204a in the xy plane which contacts the end face of the fiber to position the end face a precise distance from the laser.

In etching the alignment features on the substrate, it is often necessary to etch deeply into the substrate. For example, the bottom of the U-groove needs to be deep enough to bring the optical axis of the fiber 303 to approximately the surface 201 of the substrate plus or minus the distance the optical axis of the laser 301 is offset from the substrate surface 201. Therefore, since a common optical fiber has a diameter of about 125 $\mu$m, a groove depth of about 62.5 $\mu$m ± the offset of the optical device's optical axis from the substrate surface is required. In addition to deep etching, it is also often necessary to etch planar surfaces perpendicular to the substrate surface. These two features have been opposing requirements historically. Specifically, while wet etching could produce deep etches, it was unable to produce vertical surfaces. On the other hand, traditional RIE could produce vertical surfaces, but it could not etch deeply (a traditional REI chlorine process has a practical etching depth limit of about 13 $\mu$m). Applicants have recognized that inductive coupling plaza (IPC) etching can reconcile these disparate requirements. IPC can not only etch deeply without a practical limit, but also etch vertical surfaces with high precision. A preferred technique of IPC etching was developed by Robert Bosch GmbH and apparatus for performing the process is commercially available through Zap PlasmaTherm. The process developed by Bosch is referred to herein as the "Bosch process."

The etching process is a subtractive process so in order to have alignment features rise above the surface it is necessary to remove everything around that feature so that the surface is actually lowered relative to the alignment feature. For this purpose, an etched field 210 is employed as shown in FIG. 2. Unlike the earlier silicon wafer board process based on chlorine RIE etching, the ICP process is sensitive to loading of the amount being etched at any time, so only areas around the critical alignment features are removed. The remaining area is left at full substrate thickness.

In the particular embodiment shown in FIG. 2, there are four etched levels plus the original wafer surface level. The deepest etch level, level 1, is at the bottom surface of the U-groove 202a. This provides clearance for the bottom of the optical fiber, and ranges typically from about 60 to about 65 $\mu$m below the surface of the substrate. This etch also defines the width of the groove. In a particular embodiment, an etch of this depth may also define the bottom 208 of the mirror well used to reflect light up to a detector. The next deepest level, level 2, is the U-groove terrace 203. Its purpose is to set the height of the fiber in the U-groove (i.e., the fiber's position along the y-axis) and thus define the edges 219. The terrace 203 must be below the etched field 210 in height in order to set the centerline of the optical fiber in line with the optical axis of the optical device on the substrate 200. The next deepest level, level 3 is the etched field 210 which serves to open up the area around the fiducials, while still maintaining a significant amount of unetched silicon surface outside the etched field. The next deepest level, level 4, is the height for the laser and detector standoff or first fiducials 205 and 215. This level is used to set the height of the chips, but also may provide clearance for the electrical traces 209 and a controlled height for the solder 211 if the optical device is an optoelectric device such as a laser or photodetector. The highest level, level 5, is for the heights of the pedestals (or the second and third fiducials) and the mechanical stop for the waveguide. This level represents the original wafer surface 201 and remains unetched.

The following is an example of a particular process that can be used to prepare the substrate of FIG. 2. This example is offered for illustrative purposes and is not intended to restrict the scope of the claimed invention. Indeed, one skilled in the art may recognize alternatives and optimization of this process.

1. Start Silicon Wafers
2. Thermal Oxidation (5500Å)
3. First Lithography (fiducials and U-groove)
4. Oxide RIE
5. Resist Strip
6. Second Lithography (U-groove Protection)
7. Bosch Etch (Pit)
8. Resist Strip
9. Third Lithography (Standoffs)
10. BOE etch
11. Resist Strip
12. Forth Lithography (U-groove Protection)
13. Bosch Etch (Pit + Standoffs)
14. Resist Strip
15. Nitride Deposition (1000Å)
16. Evaporate Ti/Ni/Au (500/500/500Å)
17. Fifth Lithography (Trace Plating)
18. Au Plate (6 $\mu$m)
19. Resist Strip
20. Sixth Lithography (Solder Plating)
21. Au/Sn/Au Plate
22. Resist Strip
23. Seventh Lithography (Metal Etch)
24. Metal Etch (KI/I:I, BOE)

-continued

25. Resist Strip
26. Eighth Lithography (U-groove Tier)
27. Resistor Etch (KI/I)
28. Resist Strip
29. Ninth Lithography (U-groove Tier)
30. Nitride Etch
31. Bosch Etch (U-groove Etch)
32. Oxide Etch
33. Bosch Etch (U-groove Tier)
34. Resist Strip
35. Inspect
36. Lap (Optional)

Steps 20 & 21 assume that the metalizations on both laser and detector are at same height It is worthwhile to note that step 3 of the process, known as first photolithography, includes both the patterning of the fiber groove and the fiducials in which all critical optical alignments are made. All other mask alignments that follow this are non critical positionally and do not affect the precision of the part. In contrast, the prior art process has at least two separate critical alignment photolithography (known as first and third photolithography). These two separate masks have to be aligned to each other within sub-micron (typically 0.1) in order to minimize mask overlay error. This can be very difficult, especially once the substrate becomes contoured with various etchings. The process of the present invention has no mask overlay error.

It is also worthwhile to mention that the oxide preparation time is reduced because the ICP process works quite well with a thinner oxide mask. The oxide/silicon etch selectivity is a factor of 10 higher than traditional RIE approaches, allowing the etch to be deeper while maintaining precision. Furthermore, the silicon etch rate is more than 10 times faster than traditional RIE (some reports have it as much as 70 times faster). These advantages are in addition to those already mentioned including independence from wafer crystal orientation, elimination of overlay error between separate masking levels, and elimination of extra masking and fabrication steps.

The result of this process is a prepared substrate 200 having alignment features of unprecedented accuracy. Because all of the critical alignment is performed in a single step, tolerances in the position of the register surfaces of fiducials and groove of about ±0.1 to 0.2 μm can be realized. Such tolerances represent a significant improvement over traditional physical alignment approaches which, at best, have tolerances of ±0.3 to 0.6 μm. At this point, the substrate is ready to be populated with the optical devices 301, 302 and fiber 303 as shown in the optical subassembly 300 of FIG. 3.

With respect to step 104, the optical devices 301, 302 are mounted to the substrate using the fiducials to align them to the groove. Although the optical device is depicted in FIG. 3 as a laser with a detector, the invention is not limited to these devices and the term "optical device" as used herein broadly covers purely-optical or optoelectric components used in both passive and active devices. The term "passive devices," as used herein, refers to any optical or optoelectric device that manipulates an optical signal but which does not impart energy into the system. Examples of passive devices include add/drop filters, arrayed wave guide gratings (AWGs), splitters/couplers, and attenuators. As used herein, the term "active device" refers to any optical or optoelectric device that either converts signals between optical and electrical domains or imparts energy into an optical system. Examples of active devices include lasers, photodetectors, monitors, and optical amplifiers. The optical device may be part of a larger assembly or it may comprise subcomponents.

In a preferred embodiment, the optical devices 301, 302 are aligned by physically abutting them against the fiducials. Such a technique is known in the art. Although this technique is known, the ICP process allows for very deep etching so it is now possible to build pedestals and standoffs that are tall enough to be useful for aligning lasers having thick regrowth structures on their epi surface such as found in buried heterostructure lasers, large spot lasers, and lasers with gratings such as DFB's.

With respect to step 105, the fiber 303 is positioned in the groove 202 such that it is optically coupled with the laser 301. Although a fiber is depicted as the waveguide in FIG. 3, the invention is not limited to these devices and the term "waveguide" as used herein refers to any optical component that transmits optical signals and includes optical fiber and planar waveguides. The waveguide may be a discrete component that is mounted within the groove or it may be deposited in the groove and formed in situ. Preferably the waveguide is a fiber.

Techniques for mounting a fiber in a groove are well known and include metalizing the fiber and soldering the fiber to the groove, or adhering the fiber to the groove using epoxy. The edges 219 defined by the U-groove 202 and U-groove terrace 203 align the fiber along the x and y axes. The fiber stop 204 is used as the fourth register surface to align the fiber along the z-axis. Alternatively, the z-axis alignment of the fiber may be done actively if desired.

The optical subassembly 300 of FIG. 3 is suitable for incorporation into various devices such as multiplexers, amplifiers, transmitters, receivers, transceivers, sensors, switching equipment, and computers using optical switching.

What is claimed is:

1. A process for preparing a substrate having alignment features to facilitate passively mounting components on said substrate having an x, y, z, orientation and a substrate surface along an xz plane, said substrate having a specific point thereon , said process comprising:

applying a stop etch mask to said substrate, said mask defining the location on said substrate of one or more fiducials for positioning a device on said substrate relative to said specific point; and etching said substrate to define said fiducials using an inductively coupled plasma etching process, at least one of said fiducials comprising a planar surface substantially perpendicular to said substrate surface, said planar surface being adapted to act as a register surface to enable said device to be positioned on said substrate such that it is in a precise position relative to said specific point.

2. The process of claim 1, wherein said inductively coupled plasma etching process is a Bosch process.

3. The process of claim 1, wherein said device is an optical device and wherein said mask also defines the location on said substrate of a groove for receiving said waveguide, and wherein said grove is also etched using an inductively coupled plasma etching process.

4. The process of claim 3, wherein said groove is deeper than 13 μm from said substrate surface.

5. The process of claim 4, wherein said groove is a U-groove.

6. The process of claim 5, wherein said U-groove has a bottom at about 60 to about 65 μm from said substrate surface.

7. The process of claim 6, wherein etching said U-groove comprises etching a U-groove terrace, said U-groove and U-groove terrace defining edges for receiving a waveguide.

8. The process of claim 3, wherein a first fiducial defines a first register surface a first certain distance from said substrate surface alone said y-axis, a second fiducial defines a second register surface a second certain distance from said specific point along said x-axis, a third fiducial defines a third resister surface a third certain distance from said specific point alone said z-axis, and wherein said groove, and said first, second and third fiducials are located on said substrate using the same mask, and wherein a mechanical stop has a fourth register surface a fourth certain distance from said specific point along said z-axis, said mechanical stop being adjacent to said groove and adapted to contact a waveguide in said groove to position it from said specific point along the z-axis.

9. The process of claim 3, wherein a mechanical stop has a fourth register surface a fourth certain distance from said specific point along said z-axis, said mechanical stop being adjacent to said groove and adapted to contact a waveguide in said groove to position said waveguide from said specific point along the z-axis.

10. The process of claim 3, wherein said waveguide is a fiber.

11. The process of claim 3, wherein, when said optical device is in said precise position, it is optically aligned with said wave guide.

12. The process of claim 1, wherein said substrate is form from a materials selected from the group consisting of polycrystalline silicon, silica, and ceramics.

13. The process of claim 1, further comprising etching an etched field encompassing said fiducials.

14. The process of claim 1, wherein a first fiducial defines a first register surface a first certain distance from said substrate surface along said y-axis, a second fiducial defines a second register surface a second certain distance from said specific point along said x-axis, a third fiducial defines a third register surface a third certain distance from said specific point along said z-axis, and wherein said groove, and said first, second and third fiducials are located on said substrate using the same mask.

15. The process of claim 1, further comprising disposing an optical device on said substrate in a certain position relation with respect to said fiducials.

16. The process of claim 15, wherein optical device is disposed on said substrate by visually aligning said optical device to said fiducials.

17. The process of claim 15, wherein said optical device is disposed on said substrate by physically contacting said optical device with said fiducials.

18. The process of claim 15, wherein further comprising disposing a waveguide in said groove.

19. The process of claim 1, wherein the tolerance of the alignment of said groove to said fiducials is less than ±0.2 $\mu$m.

20. The process of claim 1, wherein said optical device is at least one of a laser, photodetector, or monitor.

21. The process of claim 1, further comprising:
    effecting the positioning of said device against said register surface.

22. The process of claim 21, wherein said device is within ±0.2 $\mu$m of said precise position.

* * * * *